US009244925B2

(12) United States Patent
Avrahami

(10) Patent No.: US 9,244,925 B2
(45) Date of Patent: Jan. 26, 2016

(54) AUDIO DISTRIBUTION FOR ELECTRONIC TABLETOP SYSTEM

(71) Applicant: Intel Corporation, Santa Clara, CA (US)

(72) Inventor: Daniel Avrahami, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 129 days.

(21) Appl. No.: 13/623,914

(22) Filed: Sep. 21, 2012

(65) Prior Publication Data

US 2014/0085210 A1    Mar. 27, 2014

(51) Int. Cl.
*G06F 3/16* (2006.01)
*G06F 17/30* (2006.01)
*H04S 7/00* (2006.01)

(52) U.S. Cl.
CPC .......... *G06F 17/30056* (2013.01); *G06F 3/165* (2013.01); *H04S 7/302* (2013.01); *H04S 7/303* (2013.01)

(58) Field of Classification Search
CPC ................ G06F 3/16–3/167; G06F 17/30056; H04S 3/002; H04S 7/00; H04S 7/40; H04S 7/301; H04S 7/302
USPC ........................... 381/17, 18, 61, 77, 306, 310
See application file for complete search history.

(56) References Cited

U.S. PATENT DOCUMENTS

| 8,077,888 | B2 * | 12/2011 | Trepte ............................ 381/310 |
| 8,565,455 | B2 * | 10/2013 | Worrell et al. ................. 381/306 |
| 8,631,327 | B2 * | 1/2014 | Sugiyama et al. ............. 715/727 |
| 2007/0160222 | A1 * | 7/2007 | Trepte .............................. 381/61 |
| 2010/0166193 | A1 * | 7/2010 | Worrell et al. ................... 381/17 |
| 2011/0055703 | A1 * | 3/2011 | Lundback et al. ............. 715/727 |
| 2011/0116665 | A1 * | 5/2011 | King et al. ...................... 381/300 |
| 2012/0242590 | A1 * | 9/2012 | Baccichet et al. ............. 345/173 |
| 2013/0191753 | A1 * | 7/2013 | Sugiyama et al. ............. 715/727 |
| 2013/0305155 | A1 * | 11/2013 | Yoon .............................. 715/716 |

OTHER PUBLICATIONS

Morris et al., "Individual Audio Channels with Single Display Groupware: Effects on Communication and Task Strategy", CSCW 2004, Nov. 6-10, 2004, 10 pages.

* cited by examiner

*Primary Examiner* — Quan-Zhen Wang
*Assistant Examiner* — Xuemei Zheng
(74) *Attorney, Agent, or Firm* — Kacvinsky Daisak Bluni PLLC

(57) ABSTRACT

An apparatus may include a processor circuit and an audio alignment module operative on the processor circuit to determine spatial indicia for a visual portion or element of multimedia content for presentation on a digital display, the multimedia content comprising visual content and audio content. The audio alignment module may be further operative to identify an audio signal corresponding to the visual portion or element and send the identified audio signal to one or more audio output devices based on a spatial correlation between the one or more audio output devices and the determined spatial indicia of the visual portion or element.

25 Claims, 13 Drawing Sheets

Digital Presentation System
100

AUDIO DISTRIBUTION FOR ELECTRONIC TABLETOP SYSTEM

BACKGROUND

Currently large area display devices such as tabletop computers are growing in popularity. Such devices provide multiple benefits that are not easily obtained in devices having small display sizes. One benefit is the ability to display a large number of digital elements simultaneously, which may include multiple applications. The large surface area of a tabletop computer also provides the ability to support multiple users simultaneously, who typically interact with the tabletop computer through a touch screen display presented in a horizontal orientation. Accordingly, multiple users may position themselves around a tabletop computer at the same time without physically interfering with one another. This may also facilitate collaborative interaction in which one or more users may simultaneously manipulate one or more digital elements, such as pictures, videos, or other visual media. In addition, such tabletop systems typically support the ability to launch and control multiple different presentations that provide a visual display such as a window for the same or for different applications. This is especially useful in a public setting in which multiple unrelated users may wish to interact with the large area display device independently, at the same time, and with limited interference from other users.

While current large area display systems allow the spatial position of digital elements (e.g., videos, screenshows, menus, etc.) on the display surface to be manipulated and controlled by a user, the audio associated with those elements is not delivered in a spatially coherent way. For example, if two videos are playing on the large area surface at the same time, in current systems, the audio of both videos is mixed together without regard for where the videos are positioned on the large area display. For systems, such as tabletop systems, that may have display dimensions of one meter or more, this can make it difficult for a user (or users) to discern what sounds are associated with a given video.

Accordingly, there may be a need for improved techniques and apparatus to solve these and other problems.

DETAILED DESCRIPTION

Figure 1:
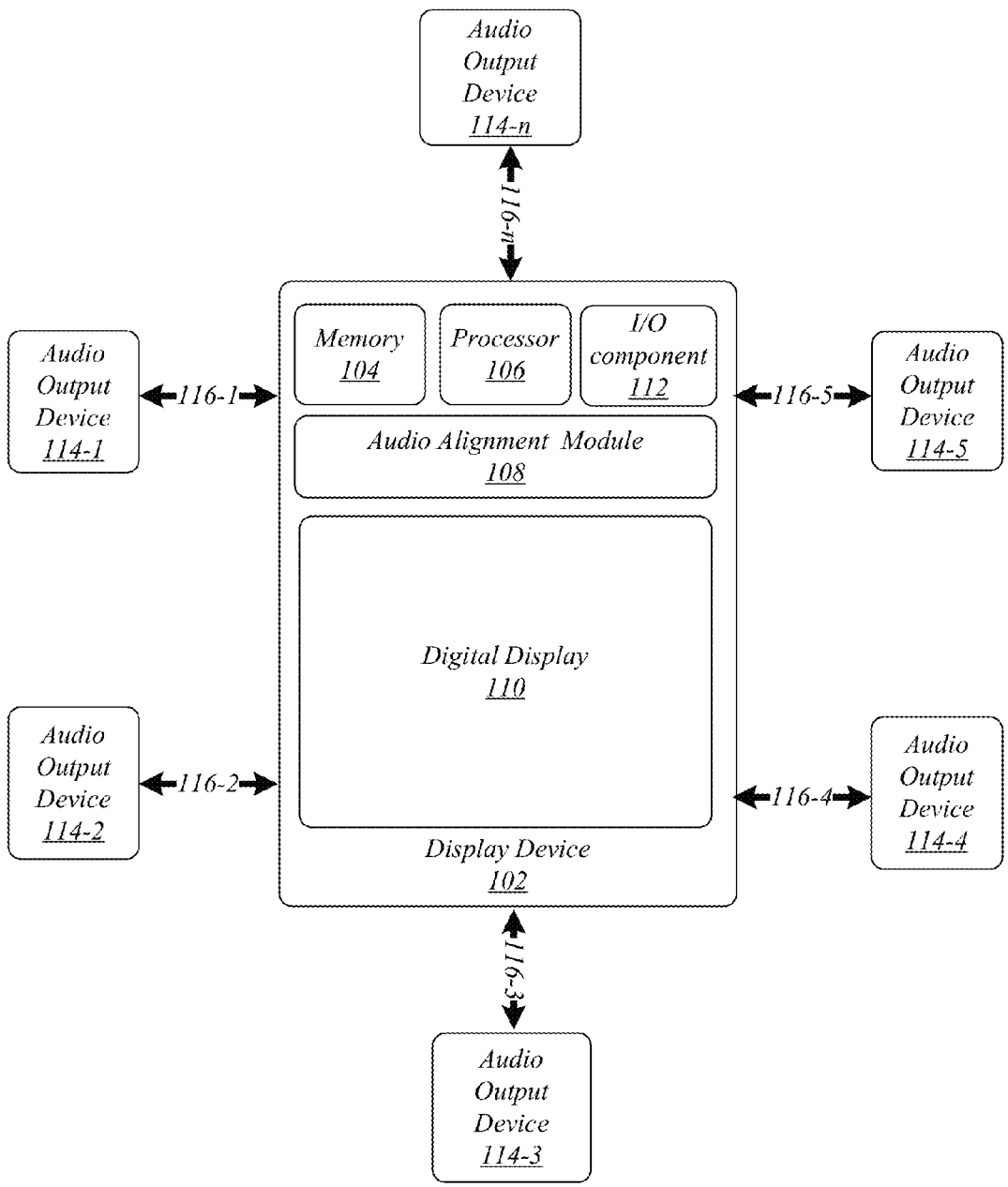
FIG. 1 illustrates a block diagram for an exemplary system.

Various embodiments are related to providing audio and visual components of a presentation in a large area display device in a spatially coherent manner. In some embodiments, a digital display system may employ a tabletop computer that is coupled to multiple audio output devices that are operative to output audio at respective multiple locations for a presentation whose visual content is shown on the display surface of the tabletop computer. In particular, the tabletop computer may generate audio output for a presentation that is spatially coherent with visual content of the same presentation. As used herein in the context of computing devices, displays, televisions, communications devices, and other electronic devices, the terms "tabletop computer" or "tabletop computing system" refer to an apparatus that presents a display configured to receive input from one or more users at the same time, typically through a touch screen interface. The term "surface computer" may also be used to refer to a tabletop computer or tabletop computer system. However, a surface computer may generally include not only large display devices, but also smaller display devices that may be comparable in size to a laptop or tablet computer.

In various embodiments, a tabletop computing system may present a touch screen display in a generally horizontal upwardly facing orientation. The display size for a tabletop computer or tabletop computing system may vary, but typically may have a diagonal length of greater than about 0.5 meters so that multiple users can position themselves about the tabletop computer to interact with the surface of the display at the same time. In some embodiments, however, a surface computer may be operative to work in a vertical orientation or at an angle of inclination between horizontal and vertical. In various embodiments the tabletop or surface computer has multiple audio output devices, such as omnidirectional speakers. The speakers may be positioned about the perimeter of a tabletop computer or in another fashion that allows users located along any side of the tabletop system to conveniently hear audio generated by at least one speaker. By providing a presentation in which a visual element is spatially coherent with audio output, the user experience is enhanced when a user or multiple users engage the tabletop computer system. The term "presentation" as used herein with respect to display systems refers to an entity, such as a streaming application, that generates a visual and an audio component (element) to be perceived by the user of the tabletop computer system. The term "multimedia content" may also be used herein synonymously with "presentation" to indicate an entity that includes visual and audio components. The terms "spatially coherent" or "spatially correlated" refer to a presentation in which there is an alignment in real space of a visual element, such as a virtual window, and the audio element, such as the location(s) where sound is generated for the presentation. In particular, audio associated with a visual element for the same presentation, such as a streaming video, may appear to originate from the same location. Moreover, as detailed below, when multiple presentations are generated simultaneously on a tabletop system, audio overlap of the multiple presentations may be reduced in accordance with the present embodiments.

FIG. 1 illustrates a block diagram for a digital presentation system 100. In various embodiments, the digital presentation system 100 may generate one or more sets of multimedia content, or presentations, at the same time, in which each presentation includes digital visual content and audio content. As illustrated, the digital presentation system 100 includes a display device 102 that is coupled to multiple audio output devices 114-1, 114-2, to 114-n over respective links 116-1, 116-2, to 116-n, where n represents any positive integer greater than one. In some embodiments, the digital presentation system 100 may be a tabletop computer in which the audio output devices 114-1 to 114-n are speakers that are housed within the tabletop computer, such as along a periphery of the computer. In other embodiments, one or more of the audio output devices 114-1 to 1114-*n* may be provided outside of the body of a tabletop computer, such as at multiple locations within a room or space in which the tabletop computer is housed.

The display device 102 may include a memory 104, a digital processor such as processor 106, audio alignment component (module) 108, a digital display 110, and an input/output (I/O) component 112. In various embodiments, the digital display 110 may be a touchscreen display that is operable to receive and respond to multiple separate inputs at different locations within a screen. The display device 102 may thereby generate one or more presentations at the same time or at different times at various locations on the digital display 110. Consistent with the present embodiments, and as detailed below with respect to the FIGs. to follow, the audio alignment module 208 may spatially correlate visual content of a presentation generated on a digital display, such as digital display 110 with the audio output for that presentation.

Figure 2:
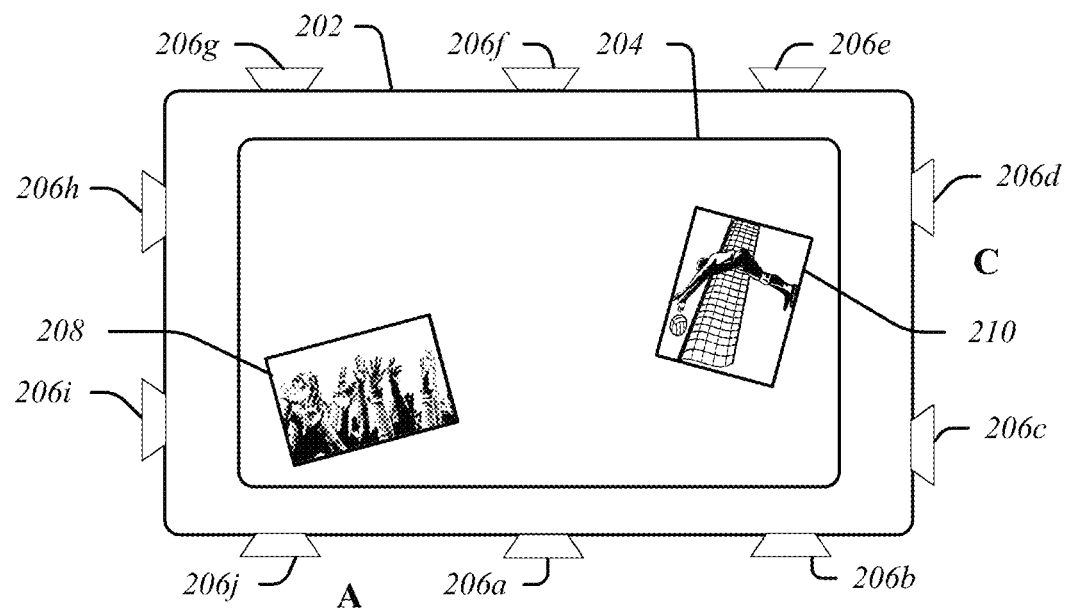
FIG. 2 depicts an embodiment of a display apparatus.
Figure 3:
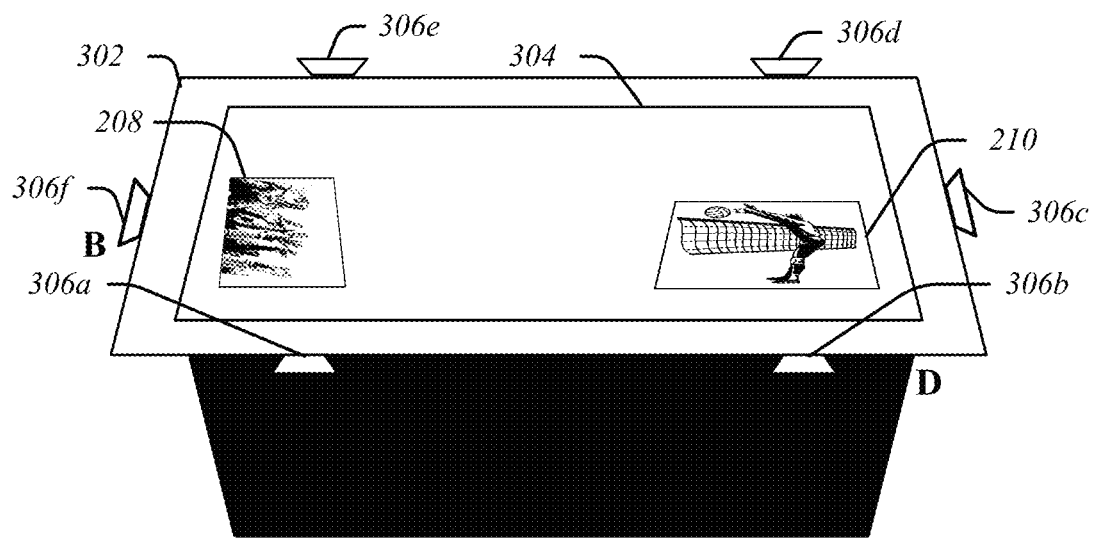
FIG. 3 depicts another embodiment of a display apparatus.

In particular, the display device 102 may execute processing operations or logic for the digital system 100 using the processor 106. The processor 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation In various embodiments, the display device 102 may be a touchscreen computing device that includes a touch screen surface that generates visual content based at least in part upon manual user interaction with the display and/or by the positioning of objects on the display. FIGS. 2 and 3 depict two respective embodiments of a touch screen device. FIG. 2 illustrates a top view of a touch screen device 202, which may be a tabletop computer in some variants. In some variants, the touchscreen device may be operable to function in a horizontal, vertical or inclined orientation. The touch screen device 202 includes a display (touchscreen) 204 that may provide the ability to recognize input at the surface of the display 204 including fingers, tags, blobs and other input. The touchscreen device 202 may generate a presentation containing visual and/or audio content in response to input at the surface of the display 204. For example, the touchscreen device may include multiple applications that can be selected, launched and manipulated by user input including touch, manual gesturing, and placing of objects on the surface of the display 204. Applications may include web browsers, media streaming applications, design programs, scientific or professional programs, art programs, videogames or other gaming programs, as well as any other programs that generate visual content. In addition, in some embodiments, objects of a specific size and shape, or containing specific tag patterns, may be uniquely identified to initiate a preprogrammed response by the display device 202.

In various embodiments, the touchscreen device 202 may be configured to launch and support multiple different presentations simultaneously, where each presentation generates or is associated with a separate visual element, such as a separate virtual window (also simply termed "window" herein) that is generated within a portion of the display 204. In various embodiments, the display 204 may be operative to recognize and respond to 50 or more inputs provided over the display so that many users may simultaneously interact with the display 204. One or more users may thereby interact over different portions of the display 204 to generate visual content to be shown on the display 204. The touchscreen device 202 further includes a set of speakers 206*a*-206*j* that are located along a periphery of the touchscreen device 202. The speakers 206*a*-206*j* may output audio associated with one or more presentations whose visual content is shown on display 204. Although illustrated as having 10 speakers, in other embodiments, more or fewer speakers may be included. The provision of multiple speakers distributed around the periphery of the touchscreen device facilitates the ability to provide audio to users positioned at any location such as locations "A" and "C." In various embodiments, the speakers may be arranged to project sound along preferred directions, or may be omnidirectional.

In the present embodiments, unlike known tabletop systems, the touchscreeen device 202 may generate one or more presentations in which the visual and audio content are spatially correlated. FIG. 2 depicts two different windows 208, 210 that are generated in different regions of the display 204. In one example, the window 208 may be a video generated as part of a streaming application (presentation) that generates video as well as audio content. In the example shown the window 208 may depict a musical concert. The window 210 may likewise be generated for a streaming application that presents simultaneous video and audio content from a sporting event. Regarding the presentation represented by the window 208, one example of spatial correlation of visual and audio content within the presentation is the selective generation of audio output in speakers that are located proximate the window 208. For example, the audio content associated with window 208 may be selectively directed to speakers 206*i* and 206*j* that are located near the window 208. In this manner, a user positioned near the window 208 may more clearly hear the sound associated with the window 208. In particular, the user may perceive the sound associated with the concert depicted in window 208 as originating from the vicinity of window 208, as opposed to a conventional tabletop system in which the sound may be distributed in an equal manner throughout the speakers 206*i*-206*j*.

Similarly, a user may launch a presentation that generates the window 210, for which the touchscreen device 202 may generate spatially correlated audio content that is selectively directed for output at destinations proximate the window 210, such as speakers 206*c* and 206*d*. In this case the user may more clearly perceive the sound associated with the sporting event in window 210 as originating from the vicinity of window 210, as opposed to a conventional tabletop system in which the sound may be distributed in an equal manner throughout the speakers 206*i*-206*j*.

FIG. 3 depicts another embodiment of a tabletop computer 302, which may provide spatial correlation between visual and audio content of a presentation similarly to that discussed with respect to the touchscreen device 202. In the embodiment shown in FIG. 3, the tabletop computer 302 may typically function with its display 304 arranged in a horizontal position so that users may conveniently position themselves about the periphery of the tabletop computer 302 to view the display 304.

The tabletop computer 302 further includes a set of speakers 306 (individually shown as 306a to 306f) that are located along a periphery of the tabletop computer 302. The speakers 306 may output audio associated with one or more presentations whose visual content is shown on display 304. Although illustrated as having 6 speakers 306, in other embodiments, more or fewer speakers may be included. The provision of multiple speakers 306 distributed around the periphery of the tabletop computer 302 facilitates the ability to provide audio to users positioned at any location, such as locations "B" and "D." As in the touchscreen device 202, the tabletop computer 302 may generate presentations in which the visual and audio content are spatially correlated. Following the example of FIG. 2, for the presentation represented by the window 208, the audio content associated with a music concert depicted in window 208 may be selectively directed to speakers 306a and 306a that are located near the window 208. Likewise, for the presentation that generates the window 210, the audio content may be selectively directed for output at destinations proximate the window 210, such as speakers 306b and 306c.

The embodiments depicted in FIG. 2 and FIG. 3 thus may provide multiple advantages over conventional tabletop computing systems. For one, the spatial correlation of audio and visual elements for a given presentation may allow the audio and visual elements to reinforce one another. In addition, when multiple presentations are running on a display device at the same time, the present embodiments facilitate a spatial segregation of each presentation so that one presentation does not unduly interfere with another. This latter feature is further illustrated with respect to FIGS. 4 to 6.

Figure 4:
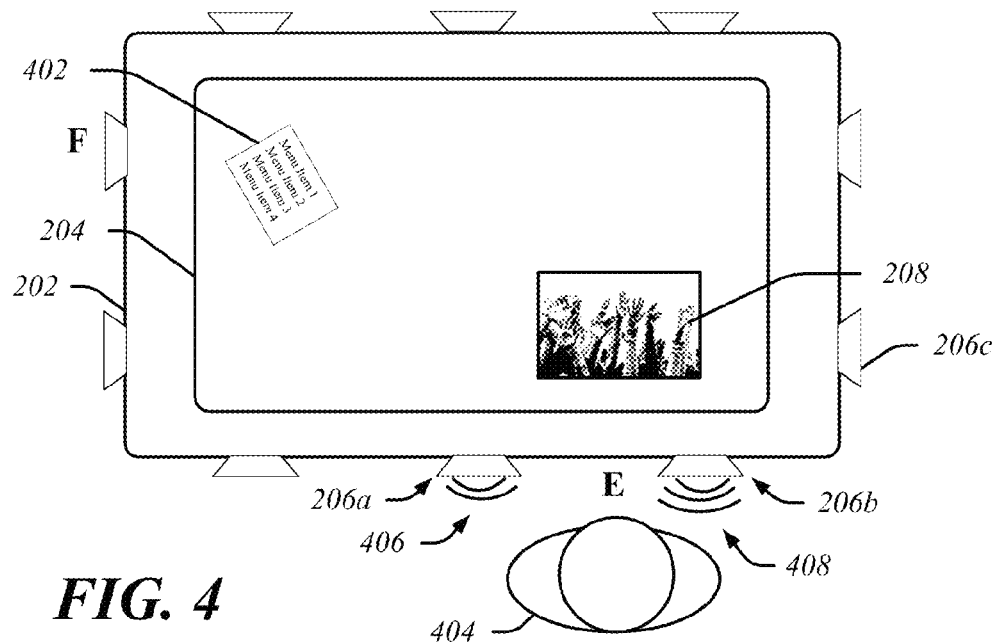
FIG. 4 depicts a use scenario of an apparatus, consistent with further embodiments.

FIG. 4 depicts one scenario for use of the touchscreen device 202. As illustrated, a top-down view shows the position of a user 404 as well as objects presented on the display 204. In this case the touchscreen device 202 is configured for use in a horizontal orientation that is typical of a tabletop computer. A single user 404 is shown standing proximate the touchscreen device 202. The touchscreen device 202 provides a menu 402, which may launch various applications and/or windows that provide visual content. As with conventional tabletop computers, the touchscreen device 202 may provide the ability to generate, drag, expand, contract, and otherwise manipulate digital elements (also termed "visual elements" herein) that are presented on the surface of the display 204 as visible objects such as a virtual window. A digital element (visible element) may constitute, for example, a window generated by an application and the visual content provided in the window. In the scenario depicted in FIG. 4, the user has launched the window 208 that provides a video of a sporting event as described previously.

As with other digital elements, the touchscreen device 202 may provide the ability to manipulate the window 208, including the ability to expand, shrink and/or drag the window 208 to a convenient location for viewing. Thus, the user 404 may move to any convenient location around the periphery of the touchscreen device 202 and position the window 208 close to the location of the user 404, as shown in FIG. 4. As noted previously, the application that generates window 208 may also generate audio signals, which may be output as sound at any of the speakers 206a of the touchscreen device 202.

Referring again to FIG. 1, in the scenario of FIG. 4, the touchscreen device 202 may employ an audio alignment module 108 to direct audio signals to specific speakers of set of speakers 206a-206j (for simplicity, not all speakers are labeled as in FIG. 2). In the scenario of FIG. 4 the audio alignment module 108 may determine that audio signals for the presentation associated with window 208 are to be sent to speakers 206a and 206b. This determination may be based in particular on the position of the window 208 proximate the location "E" illustrated in FIG. 4. The audio alignment module 108 may in one implementation determine the positions (or destinations) of various audio output devices that are coupled to the touchscreen device 202. For example, the position of each speaker of the speakers 106a-106j may be represented by indicia, such as spatial coordinates of a given speaker that provides the relative speaker position with respect to the position of the display 204. The audio alignment module 108 may be further operative to determine digital display spatial indicia, such as the current position and/or orientation on the display 204 of a window associated with an active presentation that is presented on the display 204.

In one particular example, the audio alignment module may be operative to determine an x-y coordinate of the window 208, which may, but need not be, the x-y coordinate of the center of the window 208. In one embodiment, the x-y coordinate for a digital element may be determined by collecting signals that indicate which pixels of the display 204 are currently within the window 208. Accordingly, once the current x-y coordinate of the window 208 is determined, this information may be used to spatially correlate with location information for possible destinations of the audio associated with window 208. In the implementation shown in FIG. 4 the audio alignment module may determine a location coordinate(s) for each of the speakers 206a-206j and thereby determine which speaker(s) are most closely spatially correlated to the window 208. Such coordinates may be known and stored in the memory, such as memory 104. In one implementation, the spatial correlation used to determine which speakers of speakers 206a-206j are to receive audio signals may be involve calculating which of the speakers(s) are located at the shortest distance from the window 208. In another implementation, the spatial correlation may take into account other factors such as the direction of audio output by each speaker. With knowledge of the direction and position of each speaker and position of window 208, the audio signals may be distributed to provide optimal sound to a user 404 located proximate the window 208.

Once the relative position of the window 208 is determined with respect to the position of the set of speakers 206a-206j (destinations for audio), audio signals may be distributed for output at the desired destinations. As shown in FIG. 4, rather than distribute audio output throughout the set of speakers 206a-206b, the audio is selectively output only at speakers 206a and 206b, which may represent the speakers that are located closest to the current position of window 208 as noted above. Other speakers 206c-206j receive no audio signals to output sound from the presentation for window 208. As illustrated, the intensity of audio output may be "balanced" between the speakers 206a and 206b according to their relative proximity to window 208. Thus, as suggested in FIG. 4, due to the closer proximity of speaker 206b to window 208, the audio output 408 at speaker 206b may have higher strength than the audio output 406 at speaker 206a. It is to be noted that in the example of FIG. 4, no audio output is generated at speaker 206c, even though the speaker 206c may be approximately the same distance removed from window 208a as speaker 206a. In this case, the audio alignment module may determine that due to the direction of speaker 206c, or due to the fact that a portion of the touchscreen device 202 is positioned between the user 404 and speaker 206c, audio signals are not to be sent to the speaker 206c because audio generated by speaker 206c would be less easily perceived by the user 404. In the above manner, for a given audio output power, the user 404 may more clearly perceive the music associated with the music concert depicted in window 208 than if the audio of the same power level were distributed evenly throughout the set of speakers 206a-206j. Moreover, the user 404 may perceive the sound generated by speakers 206a, 206b as originating from the window 208. In addition, by selectively directing audio to only speakers 206a, 206b, less "noise" is generated for users stationed at other locations around the touchscreen device 202 who may not wish to hear audio associated with the window 208. Although in embodiments of omnidirectional speakers, for example, other users positioned at different locations may still perceive sound generated by speakers 206a, 206b, and may therefore enjoy the same presentation shown in window 208, the level of perceived sound may be lower at the other locations, such as location F.

Figure 5:
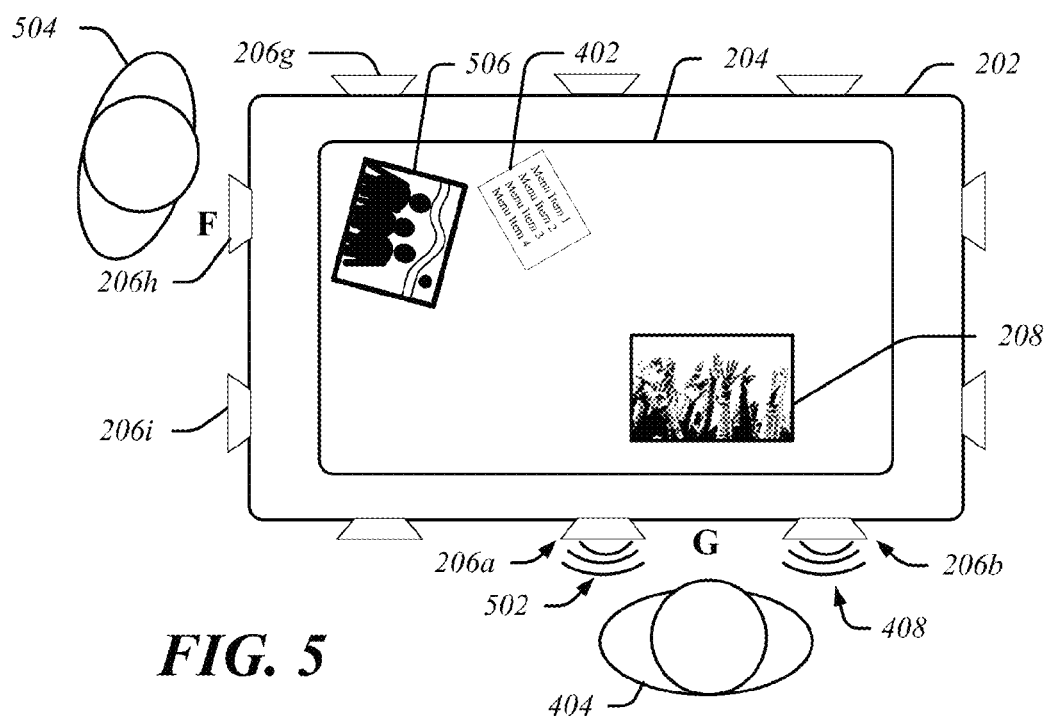
FIG. 5 depicts another use scenario of the apparatus of FIG. 4.

Thus, the spatial correlation of visual and audio content of a presentation as provided in the example of FIG. 4 may allow other users to interact with touchscreen device 202 in other portions of the display 204 without undue interference from sound generated for the presentation associated with window 208. In particular, FIG. 5 illustrates another scenario for operating the touchscreen device 202 that further illustrates this feature. In FIG. 5, the user 404 continues to view the presentation of window 208. In the scenario of FIG. 5, the user 404 has slightly shifted position to location "G" and has accordingly moved the window 208 slightly. The shifting of the position of the window 208 may be detected by the audio alignment module 108, which results in a rebalancing of audio signals to the different destinations for output of sound in the set of speakers 206a to 206j. In this case, the magnitude of audio output 502 generated by speaker 206a is increased due to the closer proximity of window 208 to speaker 206a, but the output of sound at the other speakers remains the same. In addition, another user 504 is interacting with a window 506, which may be generated from a presentation that constitutes a slide show. In the instance depicted in FIG. 5, the presentation associated with window 506 generates no audio, and the presentation associated with window 208 generates no audio output from speakers located near user 504, such as speakers 206g-206i. The user 504 is therefore free to enjoy the silent slide show provided in window 506, with audio generated only from speakers 206a and 206b that are relatively remote from the user 504.

Figure 6:
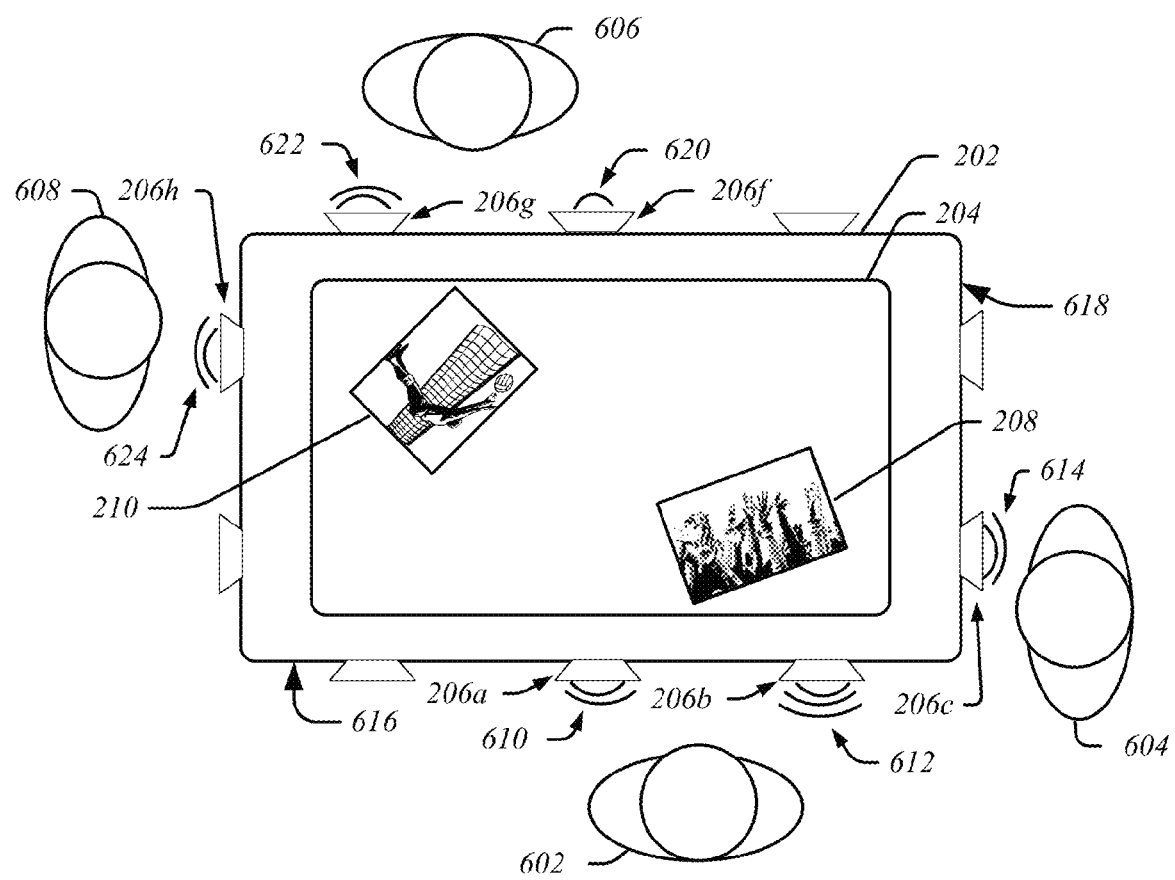
FIG. 6 depicts yet another use scenario of the apparatus of FIG. 4.

In addition to reducing unwanted sound for a user that may be interacting with a soundless application, the present embodiments facilitate spatial segregation of sound and visual content for each of multiple presentations so that multiple presentations that produce sound may be optimally experienced by multiple users at the same time. This feature is further illustrated by FIGS. 6 and 7. FIG. 6 depicts a top down view of another use scenario involving the touchscreen device 202. As illustrated, four different users 602, 604, 606, and 608 are standing at different locations around the periphery of the touchscreen device 202. The users 602 and 604 are located closer to the window 208, while the users 606 and 608 are located closer to the window 210. In one instance both users 602 and 604 may be watching the music presentation whose visual content is shown in window 208 and may be listening to audio associated with the music presentation. Consistent with the present embodiments, the audio alignment module 108 may direct audio signals associated with window 208 to be output at speakers proximate the window 208. As illustrated, speaker 206a generates audio output 610, speaker 206b generates audio output 612, and speaker 206c generates audio output 614, each of which audio output may be audio associated with the visual content of window 208.

In a variant of the scenario of FIG. 4, the window 208 is rotated with respect to its position on the display 204 in FIG. 4. In particular, the edges of the window 208 are oriented at an angle with respect to the edges 616 and 618 of touchscreen device 202, so that the content of window 208 can be viewed in a "right side-up" orientation by both users 602 and 604. In some embodiments, the audio alignment module 108 may be operative to determine the orientation of a window, such as window 208 and to employ the orientation information to distribute audio signals to the appropriate speakers. Thus, although the center of the window 208 may have approximately the same x-y coordinate in both FIGS. 4 and 6, for example, the audio output for the musical presentation associated with window 208 differs between FIG. 4 and FIG. 6. In particular, the audio output is adjusted to account for the rotation of window 208 toward an orientation in which viewing can more easily take place by a viewer positioned along the edge 618. Accordingly, the audio alignment module 108 may direct audio signals to speaker 206c, which generates audio output 614 along the edge 618, in addition to the audio output 612 and 610 from respective speakers 206b and 206a. In contrast, in the scenario of FIG. 4, the audio alignment module 108 may determine that a user is less likely to be positioned along edge 618 (see FIG. 6) since the window 208 is oriented for viewing more preferably only along the edge 616. Therefore, the audio alignment module 108 directs no audio output is directed to speaker 206c. In some embodiments, the audio alignment module 108 may determine the orientation of a window by the position of at least two corners, for example. Thus, the audio alignment module 108 may account for both x-y position and orientation of a window in order to distribute audio within the set of speakers 206a-206j.

Continuing with the example of FIG. 6, the window 210, which displays visual content associated with a sports presentation, is located near an opposite corner of the display 204 as the corner that is proximate the window 208. The window 210 is particularly positioned for convenient viewing by the users 606 and 608. As with the window 208, the audio alignment module 108 may allocate audio signals for output at a set of speakers based upon a spatial correlation of the speakers to the window 210. As illustrated, audio 620, 622, and 624 is output from respective speakers 206f, 206g, and 206h, which are located proximate the window 210. In addition, no other speakers generate audio output associated with the window 210. Accordingly, in the scenario of FIG. 6, both audio and visual content of the sports presentation shown window 210 are spatially segregated from the audio and video content associated with window 208. This allows the users 606, 608 to experience an audio/visual presentation at the same time that the users 602, 604 experience a second audio/visual presentation with reduced mutual interference between presentations as compared to a conventional tabletop apparatus in which audio from different simultaneous presentations is more evenly distributed around the periphery of the tabletop apparatus.

Figure 7:
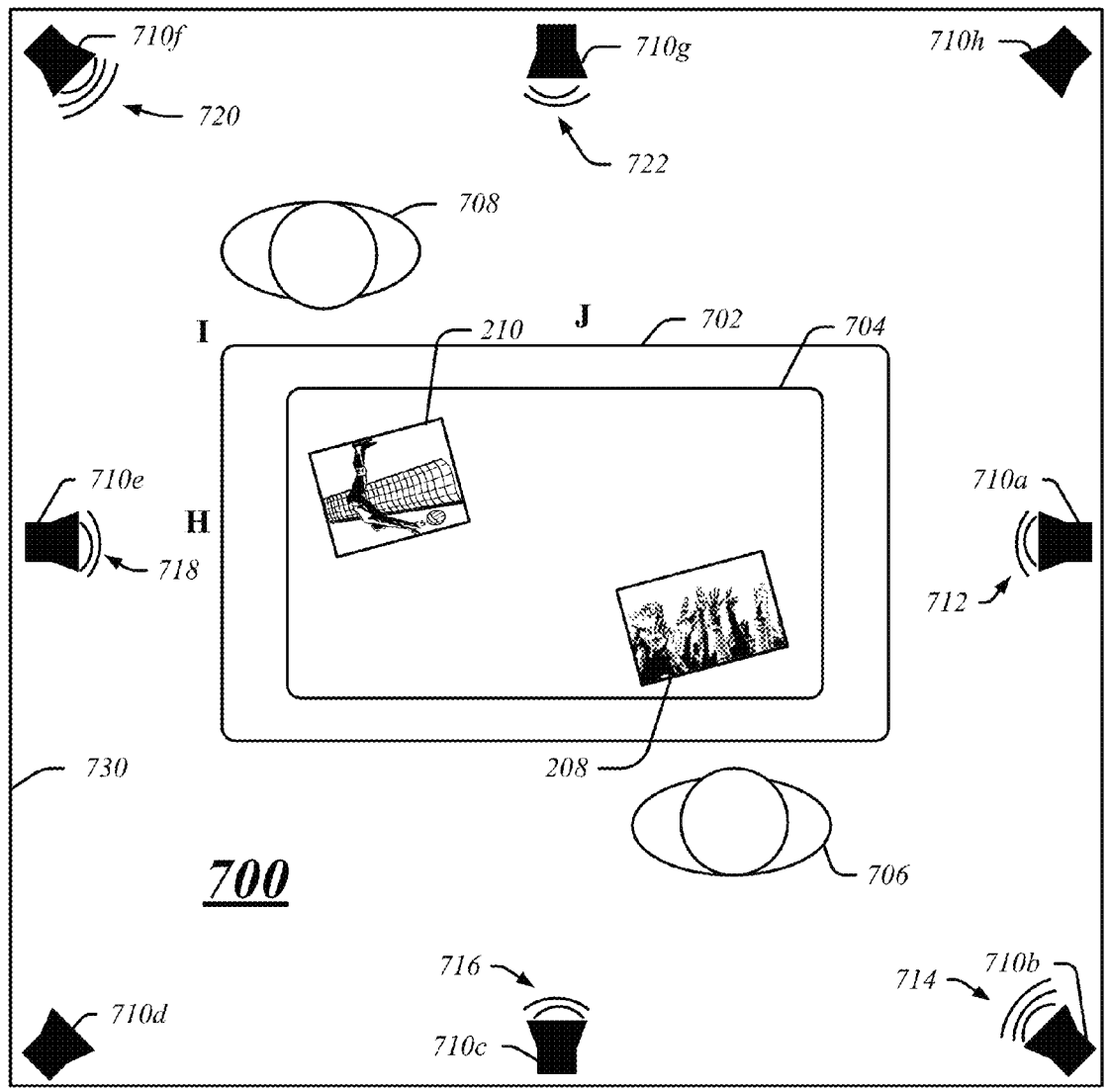
FIG. 7 depicts an embodiment of another display system.

FIG. 7 illustrates a top down view of another digital presentation system 700. In various embodiments, the digital presentation system 700 includes a display device 702 that is coupled to multiple speakers 710a-710h that are mechanically attached to the display device. In one example, the set of multiple speakers are placed at various locations around the display device 702, such as various locations in a room 730 or enclosure. The set of speakers 710a-710h may be arranged to provide sound that is projected toward a user stationed along any portion of the periphery of the display device 702, which may be a tabletop computer. In this manner, a user may interact with the display 704 from any position so as to view a presentation that may be placed by the user at any convenient location within the display 704 while listening to any audio generated by a conveniently located speaker or group of speakers of the set of speakers 710a-710h. Although not explicitly shown, the set of speakers 710a-710h may be coupled to the display device 702 through wireless links, wired links, or a combination of wired and wireless links. In the multi-user scenario shown in FIG. 7, two user 706 and 708 are located approximately at opposing corners of the display device 702 and each are interacting with a respective window 208, 210 which may function to provide visual content of respective presentations as described above.

In accordance with the present embodiments, an audio alignment module, such as audio alignment module 108 may control the distribution of audio signals associated with the presentation for each window 208, 210. As illustrated in FIG. 7, speakers 710a, 710b, and 710c, which are located relatively closer to user 706, generate audio output 712, 714, and 716, respectively. The audio alignment module 108 may operate in a manner that the audio output 712, 714, and 716 are generated from audio signals associated with the visual content generated in window 208. Thus, although the audio output is more remotely located with respect to the display 704 than in the previous embodiments, the audio output is nevertheless spatially aligned with the window 208. Similarly to the user 706, the user 708 may interact with the window 210 in a manner that locates the window 210 in a corner opposite of that where window 208 is located. In this case, the audio alignment module may distribute audio signals to speakers that provides spatial alignment of the audio associated with window 210 and the position of window 210. In the example illustrated, the speakers 710e-710g that are located closest to the window 210 are provided with audio signals that result in audio output 718, 720, and 722 in the respective speakers 710e, 710f, and 710g.

In other embodiments, a digital presentation system may include a tabletop computer that includes speakers housed within the computer as well as remote speakers that are not housed within the computer. An audio alignment module of such as system may operate to distribute audio signals for a presentation to destinations or channels that are associated with speaker locations that are spatially aligned to a position of a window 210 that provides the visual content of the presentation. For example, in one arrangement a first destination or channel may be coupled to the speaker 710e and to a speaker (not shown) located at the position "H" indicated in FIG. 7, a second destination may be coupled to the speaker 710f and speaker located at "I" while a third destination is coupled to the speaker 710g and a speaker located at "J." In this manner audio may be distributed in one or both output devices of a given channel that represents a set of speaker locations spatially aligned to a position of the window, such as window 210.

In accordance with various additional embodiments of a display system such as tabletop computing system, an audio alignment module may distribute audio signals associated with multiple presentations that are simultaneously running on a display in a manner that accounts for the positions and/or characteristics of the multiple presentations. For example, referring again to FIG. 6, the audio alignment module 108 may take into account the position and orientation of both windows 208 and 210 when directing audio signals for the respective presentations associated with each window. Thus, for instance, the audio output 616, 618, and 620 associated with window 210 may be generated based not only to optimize audio for users 606, and 608, but also to minimized interference with users, such as users 602, 604 who may be located proximate the position of window 208.

In additional embodiments, an audio alignment module may distribute audio signals for multiple simultaneous presentations in a manner that results in mixing of audio in various destinations. Thus, audio from multiple presentations may be output by a single speaker or speakers in some instances, depending upon factors such as the proximity of different windows associated with multiple presentations.

Figure 8A:
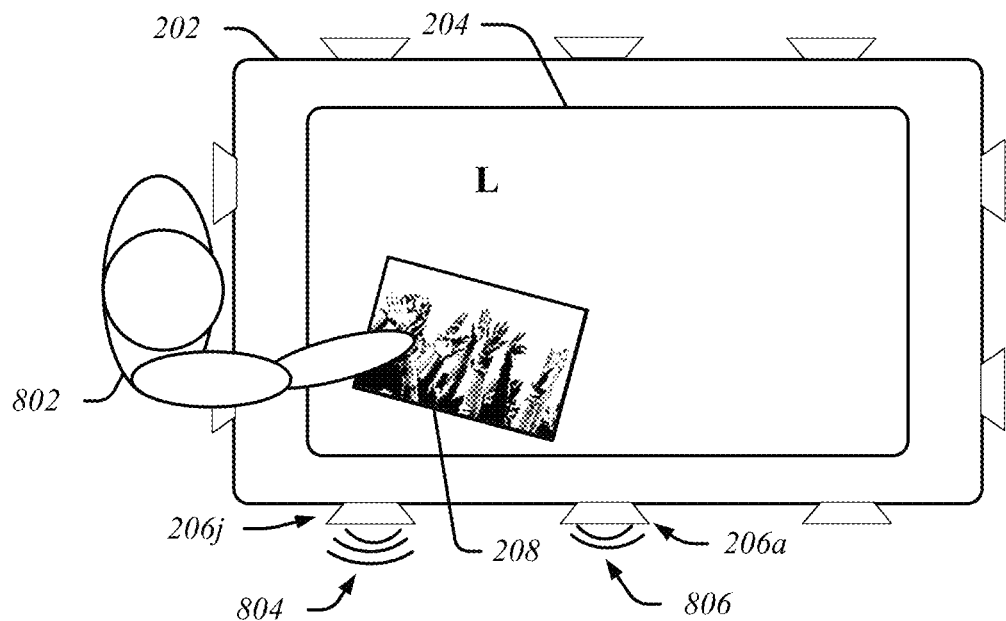
FIGS. 8a-8b together depict another use scenario of the apparatus of FIG. 4.
Figure 8B:
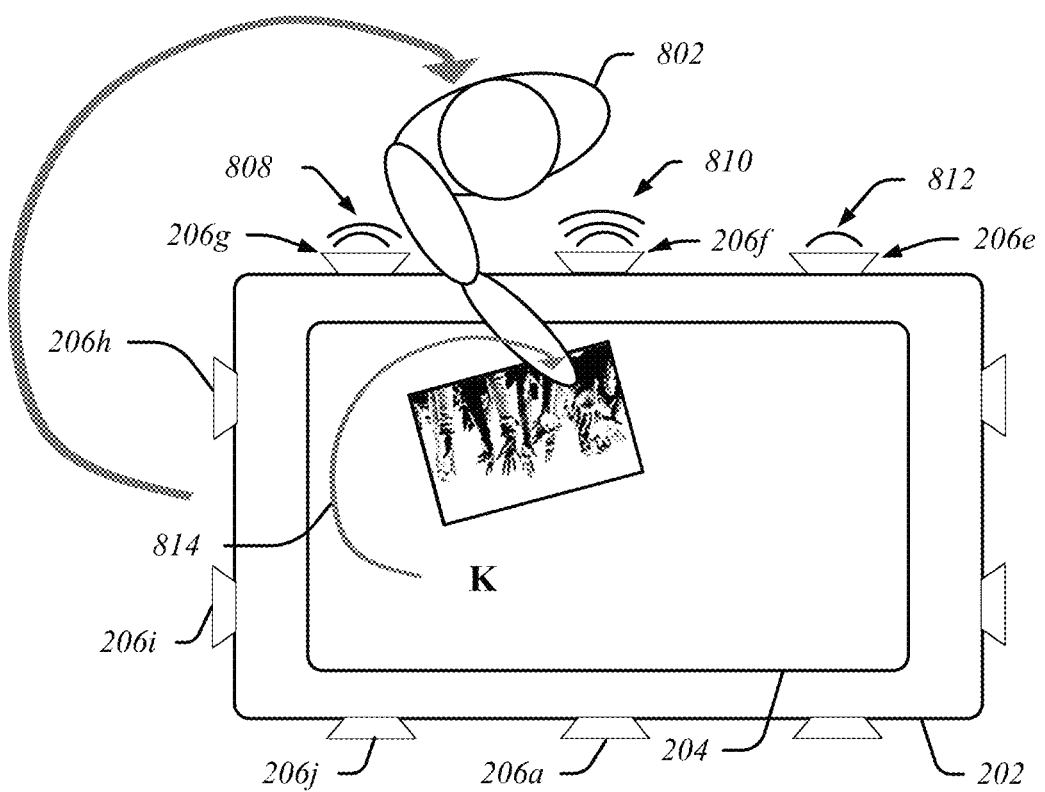

It is to be noted that the distribution of audio signals in a tabletop computing system or similar device may be dynamically adjusted by an audio alignment module in order to maintain spatial alignment between audio and visual content of a presentation. FIGS. 8a and 8b depict one use scenario for the touchscreen device 202 consistent with further embodiments. In FIG. 8a, the user 802 is depicted as manually engaging the window 208 while the window is located at a position "K" (shown in FIG. 8b for clarity) on the display 204. As illustrated, an audio alignment module (not shown) generates signals that result in audio output 804 and 806 generated by speakers 206j and 206a, respectively, based upon the current position (K) of the window 208. In the instance depicted in FIG. 8b, the user 802 has moved to another location with respect to the touchscreen device 202, and has dragged the window 208 along the path 814 to position "L" (shown in FIG. 8a for clarity) so that the user 802 can view the visual part of the musical presentations shown in window 208 from a desired perspective. In so doing, the window 208 has rotated its orientation and changed its x-y coordinate(s) from that shown in FIG. 8a. Consistent with the present embodiments, the audio alignment module may update its determination of the position and/or the orientation of the window 208. When the position and/or orientation of window 208 is updated adjustments to the distribution of audio signals for destination such as the set of speakers 206a-206j can be made to maintain spatial alignment between audio output and the current position of window 208. This updating may be done sufficiently frequently that sound produced by the set of speakers is rebalanced so that the sound is perceived as following the user 802 as the user 802 moves and drags the window 208 from position K to L. For example, referring also to FIG. 1, electronic circuitry of a processor 106 and I/O component 108 may operate at gigahertz clock frequency, such that the x-y position of a window 208 may be checked and updated many millions of times per second. This may allow the audio alignment module to adjust audio signals that may be distributed via the I/O component 108 to the set of speakers 206a-206j in a manner that is perceived as seamless to the user 802. As illustrated in FIG. 8b, at the instance in which the window 208 is located at position L the audio has been adjusted so that audio output 808, 810, and 812 is generated by respective speakers 206g, 206f, and 206e, while speakers 206a and 206j no longer generate any audio output. However, it is to be noted that during the period of time when the window 208 is moved along the path 814, the audio output may be dynamically rebalanced so that sound is also output dynamically from a sequence of speakers including 206i and 206h.

Figure 9A:
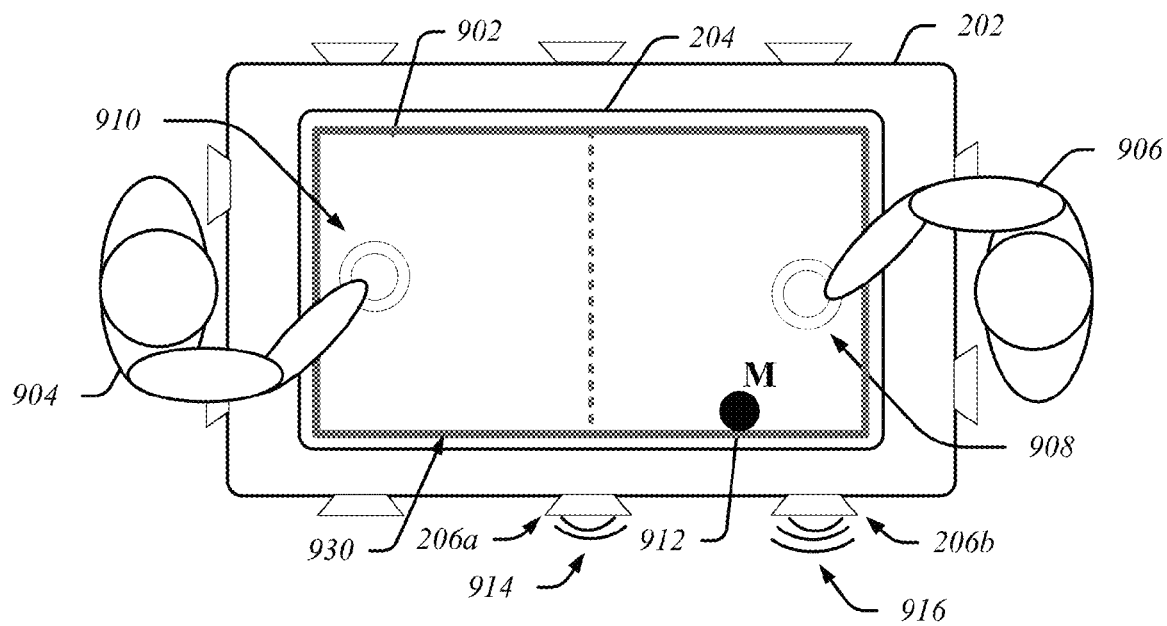
FIGS. 9a-9b together depict a further use scenario of the apparatus of FIG. 4.
Figure 9B:
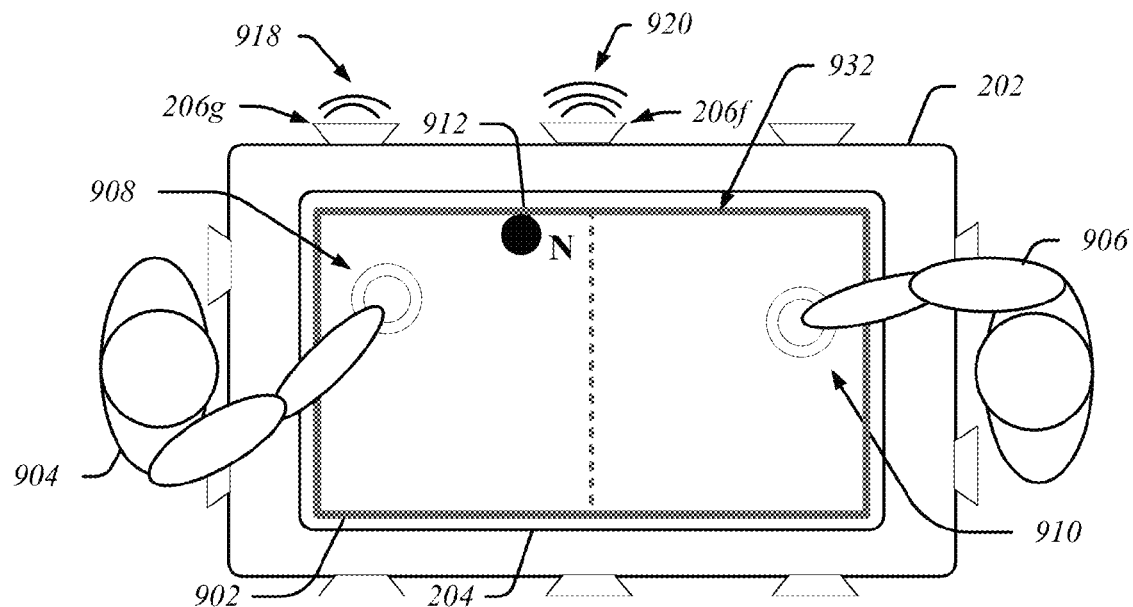

The ability to dynamically update the alignment of audio and visual elements of a presentation on a tabletop device may be especially useful for enhancing the enjoyment of applications such as animation or videogames. FIGS. 9a and 9b depict another scenario for use of the touchscreen device 202 in which an animated game is performed using the display 204. In this example, an "air hockey" game may be performed using entirely digital elements that are generated on the touchscreen surface of the display 204. In the example shown, the playing arena 902 may cover substantially the entire display 204, but in other examples the playing area of an animation may cover only a smaller portion of a display. As illustrated, each player 904, 906 controls a virtual handle or virtual disk 908, 910, respectively. Control of the virtual disks 908, 910 may be provided by touch and other gestures as known in the art. A virtual puck 912 is operable to move in response to contact with the virtual disks. The virtual disks 908, and 910, as wells as the walls of the playing arena may be act as hard objects through which the virtual puck 912 cannot move as in a real (non animated) air hockey game. In some embodiments, each time the virtual puck 912 encounters an object such as the virtual disks 908, 910 or walls of the playing field, a sound may be generated from one or more speakers 206a in a manner that is spatially aligned with the position of the virtual puck 912. Although the embodiment of FIGS. 9a, 9b shows virtual disks 908, 910, in some embodiments, physical objects that are recognized by the touchscreen device 202 may be employed as an air hockey handle or disk to control the virtual puck 912.

One instance is shown in FIG. 9a, in which the virtual puck 912 encounters a virtual side wall 930. At this time, the audio alignment module 108 may be in communication with an application that generates the virtual air hockey animation to determine that sound is to be generated corresponding to the collision of the virtual puck 912 with the virtual side wall 930. The audio alignment module 108 may consequently determine the current x-y position of the virtual puck 912 at the time of the virtual collision. Based upon this determination of the x-y position (shown as "M" in FIG. 9a), the audio alignment module 108 generates signals to cause the speakers 206a, 206b located proximate the virtual puck 912 to generate the respective audio output 914, 916. At another instance shown in FIG. 9b, the virtual puck 912 encounters the virtual side wall 932, resulting the generation of audio that is spatially aligned to the new x-y position of the virtual puck 912, shown as "N." In this case speakers 206f, 206g located proximate the new position of virtual puck 912 generate the respective audio output 920, 918.

In the example of FIGS. 9a and 9b, only an audio alignment module may allocate audio signals to the set of speakers 206a-206j based upon tracking only a single component (the virtual puck) of the animation illustrated. However, in other embodiments, multiple components that move within a window provided by an animation application may be operative to generate sound. For example, in an air hockey game, the discs 908, 910 may be configured to generate sound when striking virtual walls. Accordingly, the audio alignment module 108 may monitor the x-y position of multiple components within a window and allocate audio signals to respective speakers when events for each component of the multiple components, such as a virtual puck and virtual disc, create events to generate sound.

Figure 10:
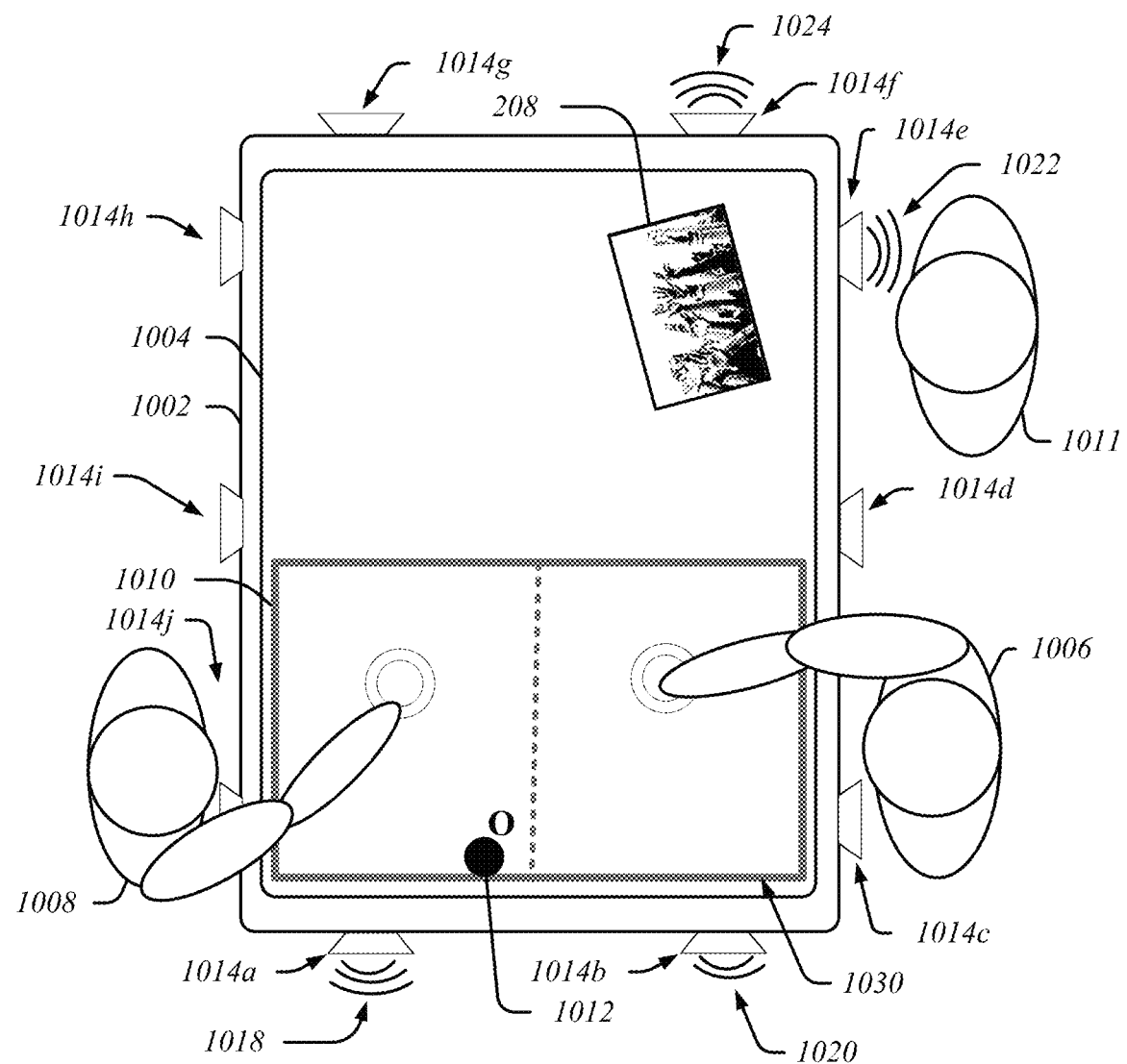
FIG. 10 depicts a still further embodiment of a display apparatus.

In still further embodiments, spatially aligned audio may be provided simultaneously for an animated game as well as other visual presentations on the same display. FIG. 10 illustrates one further use scenario in which a touchscreen device 1002 includes a display of sufficient size to accommodate a virtual air hockey game and other visual presentations on the common display 1004. In the example shown, a pair of users 1006, 1008 are participating in a game of virtual air hockey in the window or playing area 1010. The operation may be substantially as described above with respect to FIGS. 9a and 9b. Thus, whenever the virtual puck 1012 collides with a virtual object such as a virtual side wall 1030 the application that generates the virtual air hockey game generates signals to be output as sound. The audio alignment module 108 may then distribute the sound through the speakers to 1014a-1014j so as to provide spatial alignment between the x-y position of the virtual puck 1012 on the display 1004 when the collision takes place and the speakers to generate the sound of the collision. In the example of FIG. 10 when the virtual puck 1012 encounters the virtual wall 1030 at the position designated by "O" the audio alignment module 108 may distribute audio signals so that nearby speakers 1014a and 1014b generate the audio output 1018 and 1020, respectively. At the same time, a user 1011 may interact with a musical presentation that generates the window 208 described previously. The position of the window 208 causes the audio alignment module 108 to allocate audio signals for the speakers 1014e and 1014f, which generate the respective audio output 1022 and 1024. Because the position of the virtual puck 1012, and in particular, the position of collisions of the virtual puck 1012 with virtual objects, may rapidly vary with time, the audio alignment module 108 may frequently rebalance signals to one or more speakers 1014a-1014j to maintain audio alignment between the position of the virtual puck 1012 and the sound generated by the virtual air hockey game to represent the virtual collision. In some cases, audio associated with the window 108 and audio from the virtual air hockey game may be mixed in one or more speakers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
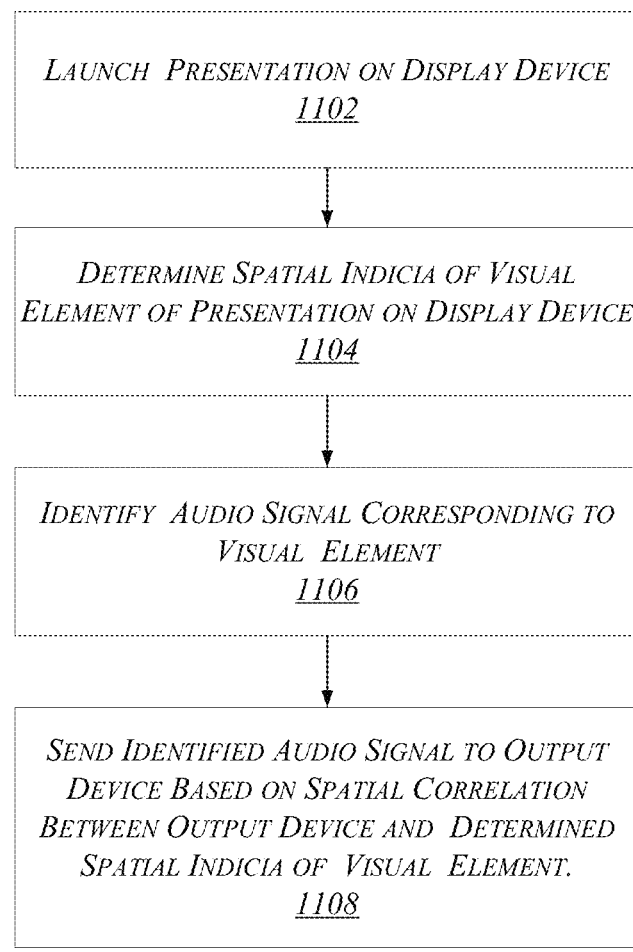
FIG. 11 presents an exemplary first logic flow.

FIG. 11 illustrates an exemplary logic flow 1100. At block 1102, a media presentation is launched on a display device. The display device may provide a touchscreen interface that allows a user to select or generate one or more presentations for running on a display of the display device. For example, a presentation may be generated when a user touches a menu or other virtual object on the display. Alternatively, a user may place an object such as a tag on the display surface that causes a presentation to be generated. At block 1104, spatial indicia are determined for a visual element on the display for the presentation. The spatial indicia may in one example be the x-y position on the display of a virtual window generated to show visual content of the presentation. In another example the spatial indicia may be the orientation of the virtual window for the presentation, while in a further example the spatial indicia may be a combination of the orientation and x-y position of the virtual window.

At block 1106, an audio signal corresponding to the visual element is identified. For example the audio content of a multimedia content that includes the visual element is identified.

At block 1108, the identified audio signal is sent to one or more audio output devices based upon a spatial correlation between the one or more audio output devices and the determined spatial indicia of the visual element.

In one example, the audio output device may be one or more speakers that form part of a presentation system including the display. The presentation system may include multiple speakers located around the display, including a set of speakers located within the display device and/or a set of speakers located outside of the display device. In this manner, audio is provided selectively to a set of speakers that may be spatially correlated with the visual component of the presentation.

Figure 12:
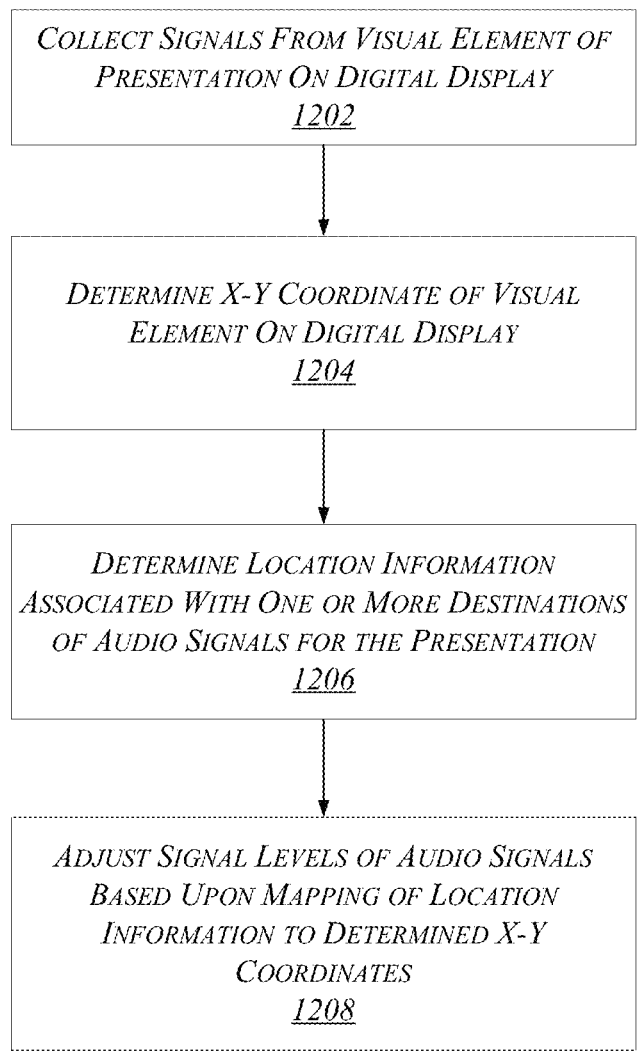
FIG. 12 presents an exemplary second logic flow.

FIG. 12 illustrates another exemplary logic flow 1200. At block 1202, signals are collected from a visual element of a presentation on a digital display. At block 1204 an x-y coordinate on the display for the visual element is determined based upon the collected signals. At block 1206 location information associated with one or more destinations for the audio signals of the presentation. At block 1208, the signal levels of audio signals for the one or more destinations is adjusted based upon mapping of location information to the determined x-y coordinates.

Figure 13:
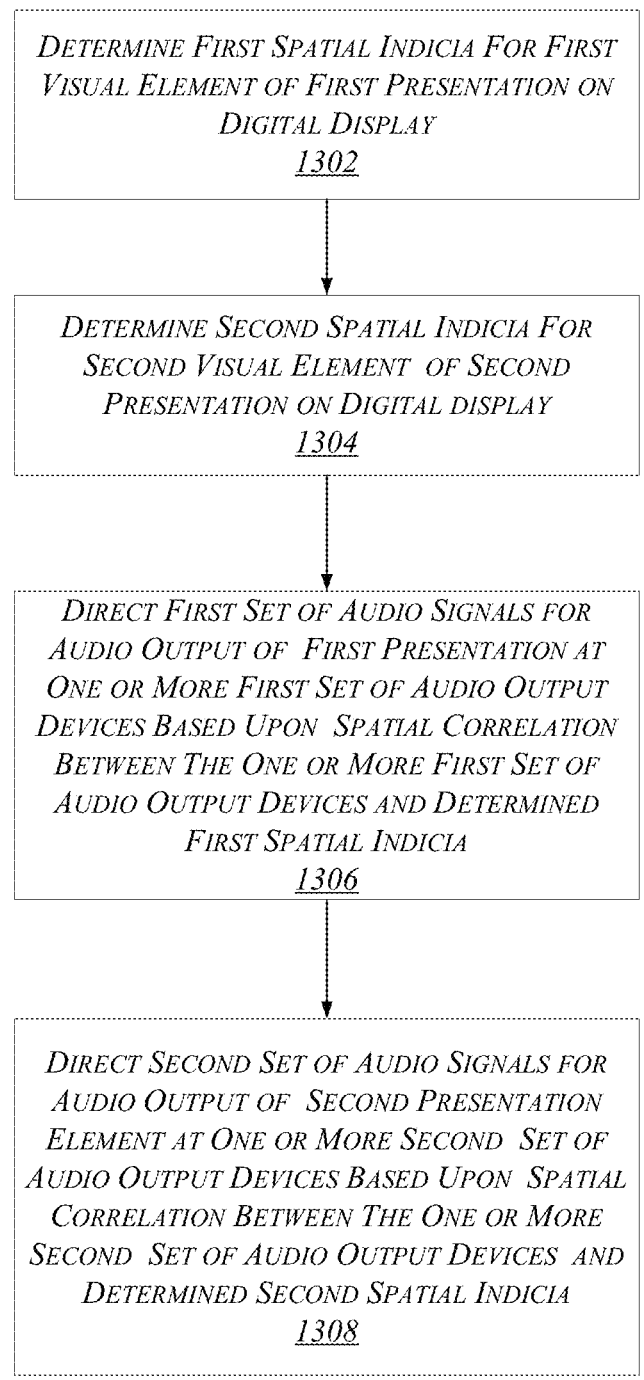
FIG. 13 presents an exemplary third logic flow.

FIG. 13 illustrates another exemplary logic flow 1300. At block 1302, first spatial indicia are determined for a first visual element of a first presentation on a digital display. At block 1304 second spatial indicia are determined for a second visual element of a second presentation on the digital display.

At block 1306, a first set of audio signals is directed for audio output of the first presentation at one or more first set of audio output devices based upon a spatial correlation between the one or more first set of audio output devices and determined first spatial indicia.

At block 1308, a second set of audio signals is directed for audio output of the second presentation at one or more second set of audio output devices based upon a spatial correlation between the one or more second set of audio output devices and determined second spatial indicia.

Figure 14:
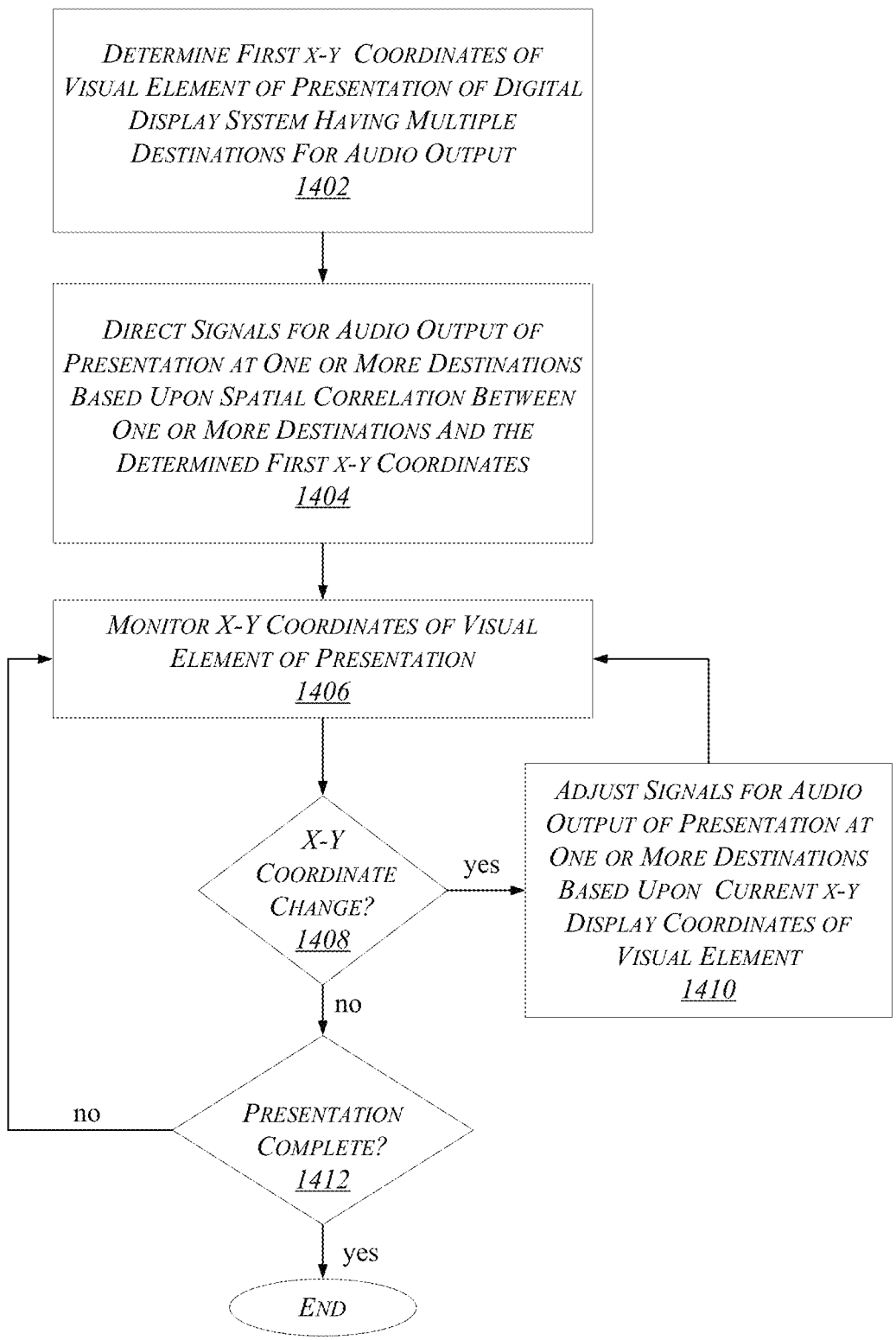
FIG. 14 presents an exemplary fourth logic flow.

FIG. 14 illustrates another exemplary logic flow 1400. At block 1402, a first set of x-y coordinates of a visual element of a presentation is determined in a digital display system having multiple destinations for audio output.

At block 1404 signals are directed for audio output of the first presentation at one or more destinations based upon a spatial correlation between the one or more destinations and the determined first x-y coordinates. The logic flow then moves to block 1406 where the x-y coordinates of the visual element are monitored. In some implementations, the x-y coordinates may be a single x-y coordinate that indicates a center of a window or another predetermined location within a window that displays visual content of the presentation. In other implementations, the x-y coordinates may constitute multiple sets of x-y coordinates, such as the coordinates of corners of a window that displays visual content, such that the x-y coordinates supply orientation information of a window in addition to location information.

The logic flow then moves to decision block 1408 in which a determination is made as to whether a change in x-y coordinates has taken place. If so, the flow moves to block 1410 where the audio signals for audio output of the presentation are adjusted at one or more destinations based upon the current display coordinates of the visual element. In one example, the audio output of is adjusted in one or more speakers included as part of a tabletop computer. The flow then returns to block 1406, where the x-y coordinates of the system continue to be monitored.

If no change has taken place the flow moves to block 1412 where a determination is made as to whether the presentation is complete. If so, the flow ends. If not, the flow returns to block 1406.

Figure 15:
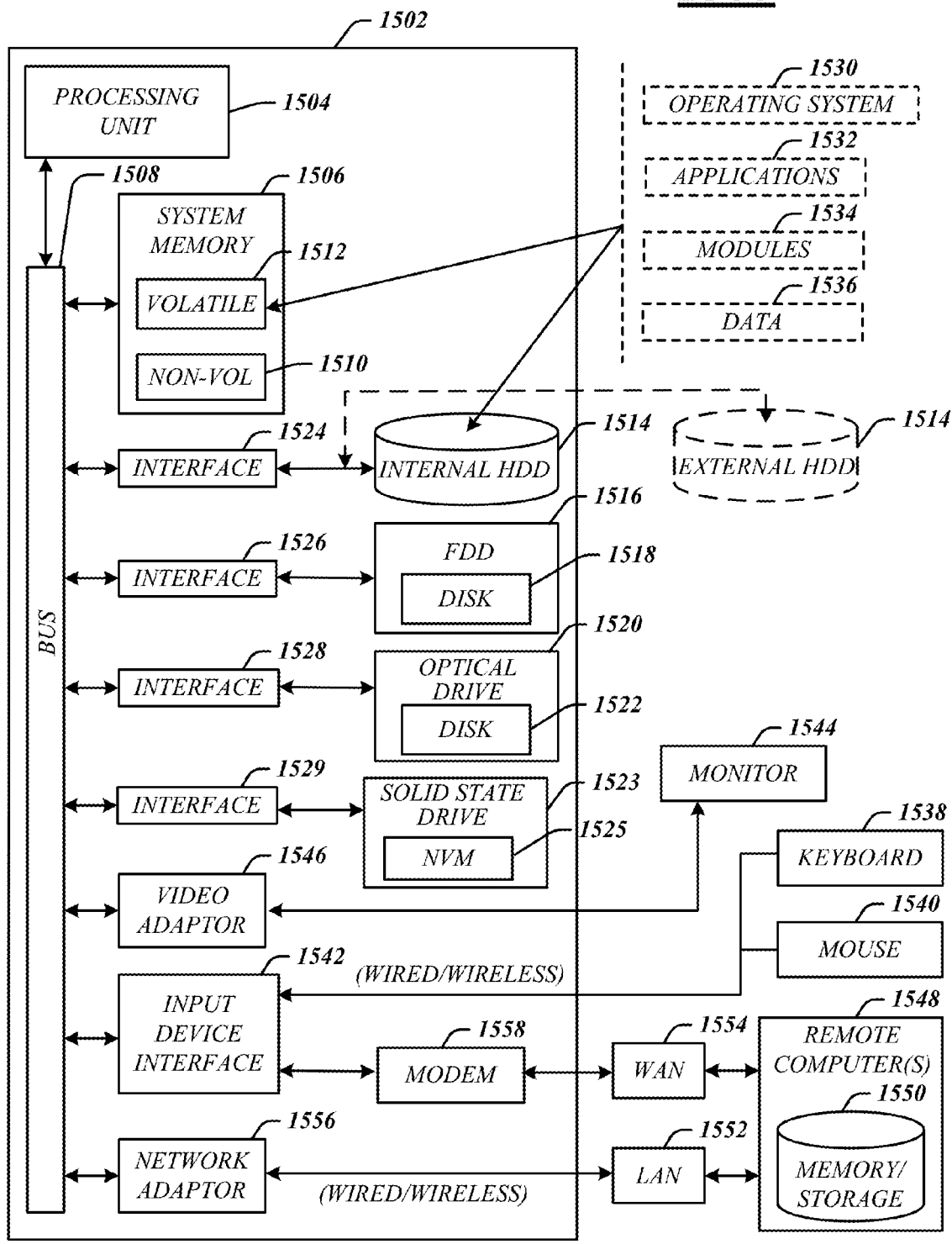
FIG. 15 is a diagram of an exemplary system embodiment.

FIG. 15 illustrates an embodiment of an exemplary computing architecture 1500 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi-processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 856.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a processor circuit and an audio alignment module operative on the processor circuit to determine spatial indicia for a visual portion or element of multimedia content for presentation on a digital display, the multimedia content comprising visual content and audio content. The audio alignment module may be further operative to identify an audio signal corresponding to the visual portion or element and send the identified audio signal to one or more audio output devices based on a spatial correlation between the one or more audio output devices and the determined spatial indicia of the visual portion or element.

In another embodiment the audio alignment module may be operable on the processor circuit to determine an x-y display coordinate of the visual element, determine location information associated with the one or more audio output devices, and adjust signal level for the audio output signals based upon a mapping of the location information to the determined x-y display coordinate.

Alternatively, or in addition, in a further embodiment the audio alignment module may be further operative on the processor circuit to determine first spatial indicia for a visual element of a first presentation, determine second spatial indicia associated with a visual element of a second presentation, direct a first set of audio signals for audio output for the first presentation at one or more first audio output devices based upon a first spatial correlation between the one or more first audio output devices and the determined first spatial indicia, and to direct a second set of audio signals for audio output for the second presentation at one or more second audio output devices based upon a second spatial correlation between the one or more second audio output devices and the determined second spatial indicia.

Alternatively, or in addition, in a further embodiment, at least one of the first and second presentations may comprise an application arranged to vary an x-y coordinate of the visual element of the respective media content as a function of time.

Alternatively, or in addition, in a further embodiment the audio alignment module may be further operative on the processor circuit to processor circuit to adjust the first set of audio signals based upon a distribution of the audio signals for audio output of the second presentation at the one or more second destinations.

Alternatively, or in addition, in a further embodiment the audio alignment module may be further operative on the processor circuit to dynamically adjust signal level of the first set of audio signals and the second set of audio signals in concert.

Alternatively, or in addition, in a further embodiment the audio alignment module may be further operative on the processor circuit to identify spatial coordinates associated with visual content of a streaming medium application.

Alternatively, or in addition, in a further embodiment the audio alignment module may be further operative on the processor circuit to determine an x-y coordinate of the visual element of the presentation as a function of time, and to adjust signal level for the audio output in the one or more audio output devices according to determined changes in the x-y coordinate.

Alternatively, or in addition, in a further embodiment the presentation may comprise a virtual window generated in response to input at a user interface.

Alternatively, or in addition, in a further embodiment the apparatus may comprise a touchscreen display, wherein the apparatus is operative to generate the visual element of the presentation in response to user input on the touchscreen display.

In an additional embodiment, a computer implemented method include determining spatial indicia for a visual portion or element of multimedia content to be displayed on a digital display, the multimedia content comprising visual content and audio content, identifying an audio signal corresponding to the visual portion or element and sending the identified audio signal to one or more audio output devices based on a spatial correlation between the one or more audio output devices and the determined spatial indicia of the visual portion or element.

In another embodiment, the computer implemented method includes determining an x-y display coordinate of the visual output, determining location information associated with the one or more destinations, and adjusting signal level of the audio output signals based upon a mapping of the location information to the determined x-y display coordinate.

Alternatively, or in addition, in a further embodiment the computer implemented method comprises determining first spatial indicia for a first visual element of a first presentation, determining second spatial indicia associated with a second visual element of a second presentation, directing a first set of audio signals for audio output for the first presentation at one or more first audio output devices based upon a first spatial correlation between the one or more first audio output devices and the determined first spatial indicia, and directing a second set of audio signals for audio output for the second presentation at one or more second audio output devices based upon a second spatial correlation between the one or more second audio output devices and the determined second spatial indicia.

Alternatively, or in addition, in a further embodiment the computer implemented method comprises adjusting the first set of audio signals based upon a distribution of the audio signals for audio output of the second media content at the one or more second destinations.

Alternatively, or in addition, in a further embodiment the computer implemented method comprises dynamically adjusting signal level of the first set of audio signals and the second set of audio signals in concert.

Alternatively, or in addition, in a further embodiment the computer implemented method comprises identifying spatial coordinates associated with visual content of a streaming medium application.

Alternatively, or in addition, in a further embodiment the computer implemented method comprises determining an x-y coordinate of the visual element of the presentation as a function of time, and adjusting signal level of the audio output in the one or more audio output devices according to determined changes in the x-y coordinate.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor circuit; and
an audio alignment module operative on the processor circuit to:
determine spatial indicia for a visual portion or element of multimedia content for presentation on a digital display, the multimedia content comprising visual content and audio content;
determine location information associated with a plurality of audio output devices;
identify an audio signal corresponding to the visual portion or element;
identify a first one, a second one, and a third one of the plurality of audio output devices based on a spatial correlation between the one or more audio output devices and the determined spatial indicia of the visual portion or element;

balance the audio signal between the first and the second one of the audio output devices;

determine whether the third one of the audio output devices faces a different direction than the first or the second audio output devices;

send the audio signal to the first and the second one of the audio output devices, wherein the audio signal has a higher intensity at the first one of the audio output devices relative to the second one of the audio output devices; and not send the audio output signal to the third one of the audio output devices based on the determination that the third one of the audio output devices faces a different direction than the first or the second audio output devices.

2. The apparatus of claim 1, the audio alignment module operative on the processor circuit to:

determine an x-y display coordinate of the visual element; and adjust signal level for the audio output signals based upon a mapping of the location information to the determined x-y display coordinate.

3. The apparatus of claim 1, the audio alignment module operative on the processor circuit to:

determine first spatial indicia for a visual element of a first presentation;

determine second spatial indicia associated with a visual element of a second presentation;

direct a first set of audio signals for audio output for the first presentation at one or more first set of audio output devices based upon a first spatial correlation between the one or more first set of audio output devices and the determined first spatial indicia; and direct a second set of audio signals for audio output for the second presentation at one or more second set of audio output devices based upon a second spatial correlation between the one or more second set of audio output devices and the determined second spatial indicia.

4. The apparatus of claim 3, at least one of the first and second presentations comprising an application arranged to vary an x-y coordinate of the visual element of the respective media content as a function of time.

5. The apparatus of claim 3, the audio alignment module operative on the processor circuit to adjust the first set of audio signals based upon a distribution of the audio signals for audio output of the second presentation at the one or more second audio output devices.

6. The apparatus of claim 3, the audio alignment module operative to dynamically adjust signal level of the first set of audio signals and the second set of audio signals in concert.

7. The apparatus of claim 1, the audio alignment module operative on the processor circuit to identify spatial coordinates associated with visual content of a streaming medium application.

8. The apparatus of claim 1, the audio alignment module operative to:

determine an x-y coordinate of the visual element of the presentation as a function of time; and adjust signal level for the audio output in the one or more audio output devices according to determined changes in the x-y coordinate.

9. The apparatus of claim 1, the presentation comprising a virtual window that is generated in response to input at a user interface.

10. The apparatus of claim 1, comprising a touchscreen display, the apparatus operative to generate the visual element of the presentation in response to user input on the touchscreen display.

11. At least one computer-readable storage medium comprising instructions that, when executed, cause a system to:

determine spatial indicia for a visual portion or element of multimedia content to be displayed on a digital display, the multimedia content comprising visual content and audio content;

determine location information associated with a plurality of audio output devices;

identify an audio signal corresponding to the visual portion or element;

identify at least two of the plurality of audio output devices based on a spatial correlation between the one or more audio output devices and the determined spatial indicia of the visual portion or element;

balance the identified audio signal between the at least two of the audio output devices;

determine whether the third one of the audio output devices faces a different direction than the first or the second audio output devices;

cause the identified audio signal to be sent to the audio signal to the at least two audio output devices, wherein the audio signal has a higher intensity at a first one of the at least two of the audio output device relative to a second one of the at least two of the audio output devices; and cause the identified audio signal to not be sent to the third one of the audio output devices based on the determination that the third one of the audio output devices faces a different direction than the first or the second audio output devices.

12. The at least one computer-readable storage medium of claim 11 comprising the instructions that, when executed, cause the system to:

determine an x-y display coordinate of the visual output; and adjust signal level for the audio output based upon a mapping of the location information to the determined x-y display coordinate.

13. The at least one computer-readable storage medium of claim 11, comprising the instructions that, when executed, cause the system to:

determine first spatial indicia for a first visual element of a first presentation;

determine second spatial indicia associated with a second visual element of a second presentation;

direct a first set of audio signals for audio output for the first presentation at one or more first audio output devices based upon a first spatial correlation between the one or more first audio output devices and the determined first spatial indicia; and direct a second set of audio signals for audio output for the second presentation at one or more second audio output devices based upon a second spatial correlation between the one or more second audio output devices and the determined second spatial indicia.

14. The at least one computer-readable storage medium of claim 13, comprising the instructions that, when executed, cause the system to adjust the first set of audio signals based upon a distribution of the audio signals for audio output of the second presentation at the one or more second audio output devices.

15. The at least one computer-readable storage medium of claim 13, comprising the instructions that, when executed, cause the system to dynamically adjust signal level of the first set of audio signals and the second set of audio signals in concert.

16. The at least one computer readable medium of claim 11, comprising the instructions that, when executed, cause the system to identify spatial coordinates associated with visual content of a streaming medium application.

17. The at least one computer readable medium of claim 16, comprising the instructions that, when executed, cause the system to:
determine an x-y coordinate of the visual element of the presentation as a function of time; and
adjust signal level for the audio output in the one or more audio output devices according to determined changes in the x-y coordinate.

18. The at least one computer readable medium of claim 11, comprising the instructions that, when executed, cause the system to generate a virtual window in response to input at a user interface.

19. A computer implemented method, comprising:
determining spatial indicia for a visual portion or element of multimedia content to be displayed on a digital display, the multimedia content comprising visual content and audio content;
determining location information associated with a plurality of audio output devices;
identifying an audio signal corresponding to the visual portion or element;
identifying at least two of the plurality of audio output devices based on a spatial correlation between the one or more audio output devices and the determined spatial indicia of the visual portion or element;
balancing the identified audio signal between the at least two of the audio output devices;
determining whether the third one of the audio output devices faces a different direction than the first or the second audio output devices;
causing the identified audio signal to be sent to the audio signal to the at least two audio output devices, wherein the audio signal has a higher intensity at a first one of the at least two of the audio output device relative to a second one of the at least two of the audio output devices; and
causing the identified audio signal to not be sent to the third one of the audio output devices based on the determination that the third one of the audio output devices faces a different direction than the first or the second audio output devices.

20. The computer implemented method of claim 19, comprising:
determining an x-y display coordinate of the visual output; and
adjusting signal level of the audio output signals based upon a mapping of the location information to the determined x-y display coordinate.

21. The computer implemented method of claim 19, comprising:
determining first spatial indicia for a first visual element of a first presentation;
determining second spatial indicia associated with a second visual element of a second presentation;
directing a first set of audio signals for audio output for the first presentation at one or more first audio output devices based upon a first spatial correlation between the one or more first audio output devices and the determined first spatial indicia; and
directing a second set of audio signals for audio output for the second presentation at one or more second audio output devices based upon a second spatial correlation between the one or more second audio output devices and the determined second spatial indicia.

22. The computer implemented method of claim 21, comprising adjusting the first set of audio signals based upon a distribution of the audio signals for audio output of the second media content at the one or more second audio output devices.

23. The computer implemented method of claim 21, comprising dynamically adjusting signal level of the first set of audio signals and the second set of audio signals in concert.

24. The computer implemented method of claim 19, comprising identifying spatial coordinates associated with visual content of a streaming medium application.

25. The computer implemented method claim of 19, comprising:
determining an x-y coordinate of the visual element of the presentation as a function of time; and
adjusting signal level of the audio output in the one or more audio output devices according to determined changes in the x-y coordinate.

* * * * *